Figure 4:
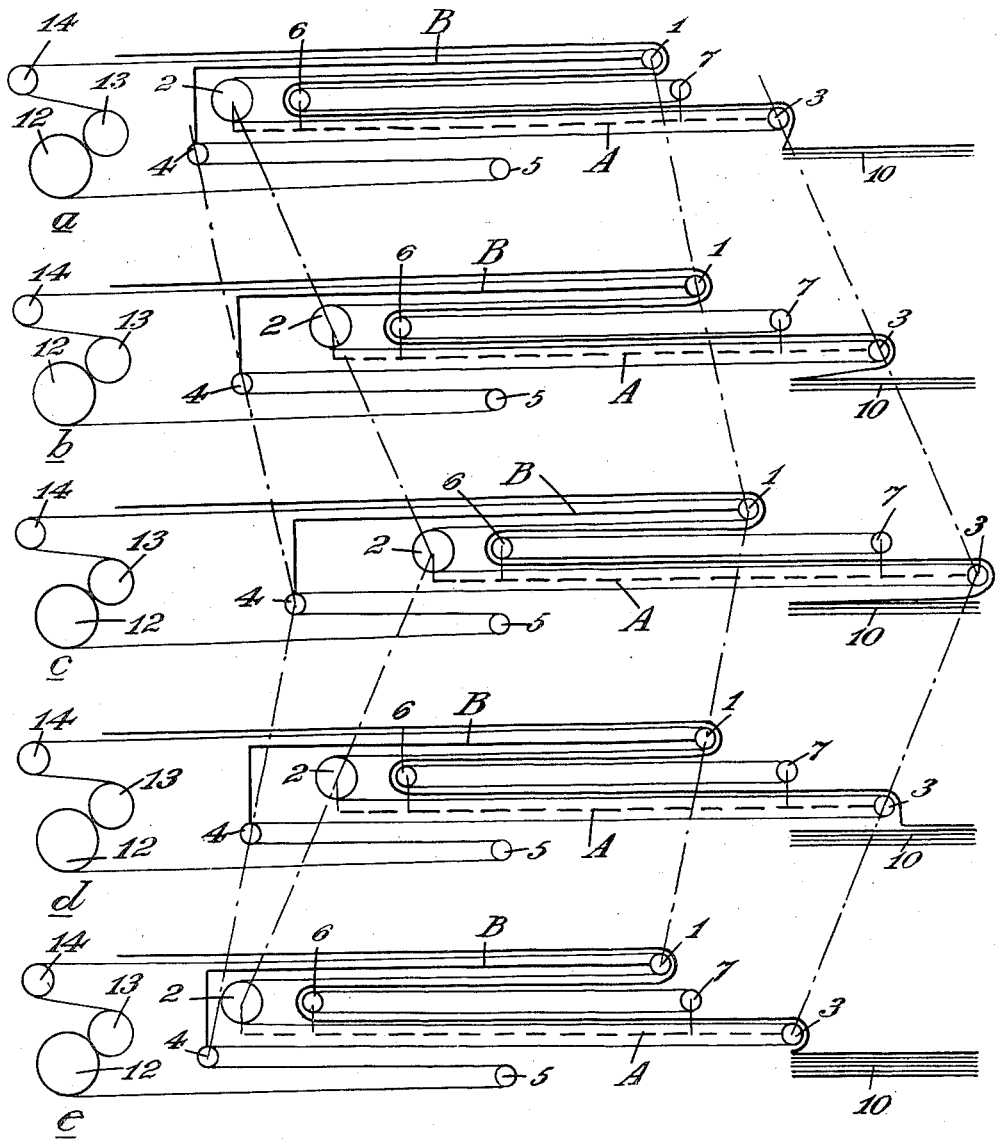

Aug. 2, 1949.  G. R. BAKER  2,478,075
FORMATION OF CONTINUOUS LAMINATED
BISCUIT DOUGH OR OTHER WEBS
Filed May 8, 1945  3 Sheets-Sheet 1
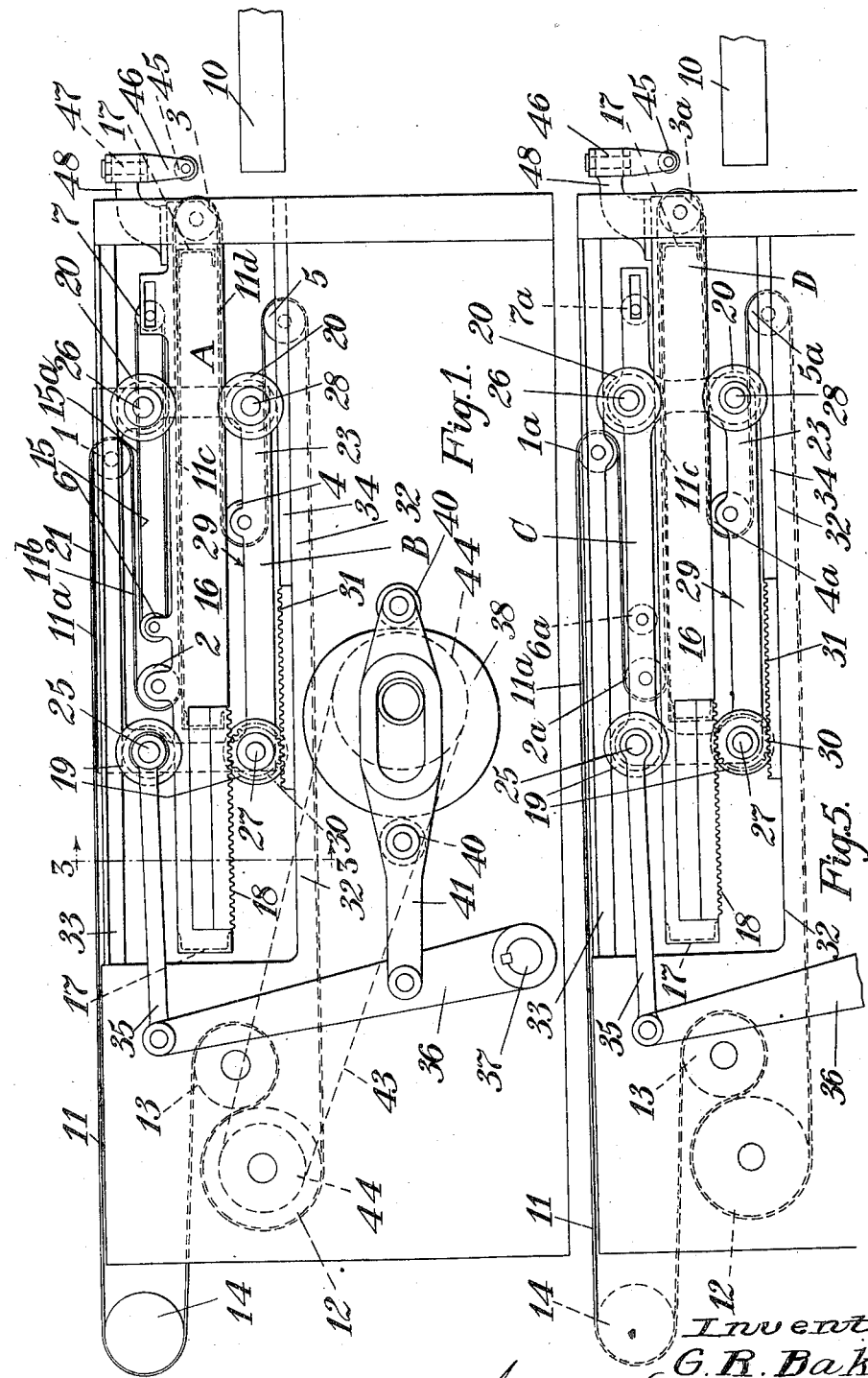
Inventor
G. R. Baker

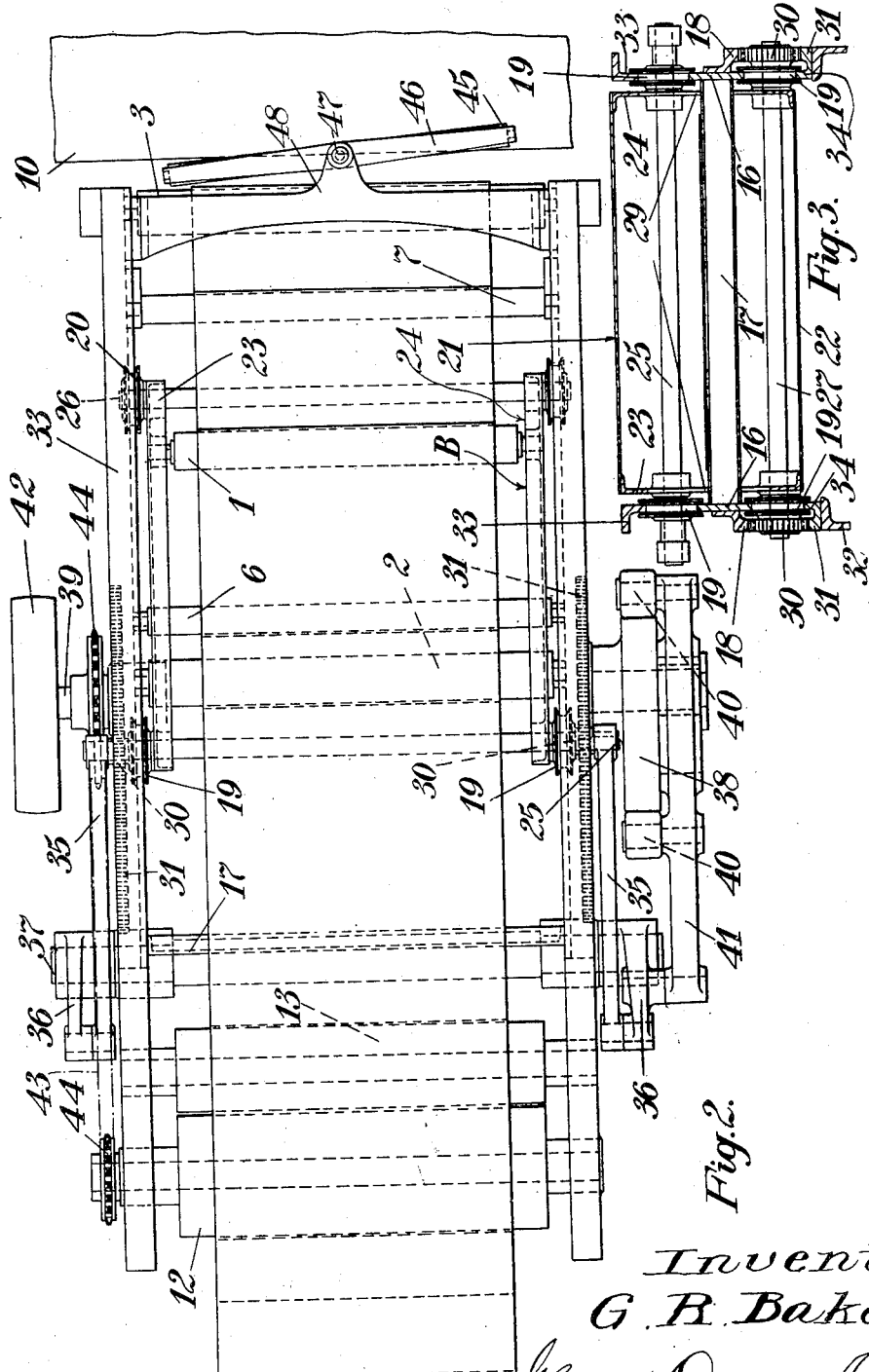

Patented Aug. 2, 1949

2,478,075

UNITED STATES PATENT OFFICE 2,478,075

FORMATION OF CONTINUOUS LAMINATED BISCUIT DOUGH OR OTHER WEBS

George Ralph Baker, Peterborough, England

Application May 8, 1945, Serial No. 592,684
In Great Britain May 1, 1944

4 Claims. (Cl. 107—1)

This invention relates to methods and means for the formation of laminated biscuit dough or other webs of the type wherein dough or the like (hereinafter called dough) in the form of a web or continuous sheet is laid in superposed laps upon a receiving conveyor to form the laminated dough web.

The laying of a dough supply web in superposed laps or folds to form a laminated dough web upon a receiving conveyor has previously been carried out, according to one mode, by feeding the dough supply web vertically upon the receiving conveyor while at the same time oscillating the dough web to and fro. This method of operation is open to the objection that while it is suitable for the harder biscuit doughs, it subjects the oscillating depending portion of dough to a gravitational tension which is liable to cause rupture of the dough when the method is applied to the softer biscuit doughs.

It has previously been proposed to avoid this limitation in scope and provide a method adapted to be serviceable for both hard and soft doughs by feeding and laying the dough supply web in a substantially horizontal direction upon a continuously travelling transverse receiving conveyor so that gravity has practically no tensioning effect upon the dough. While this proposal overcomes the limitation referred to above, the means adopted for carrying out the method necessitates an intermittent feed of the dough supply web, that is to say while the dough is being laid in one of the two directions to provide a lamination layer, the feed supply and whole conveyor supporting the dough supply web must be brought to rest, with the attendant objections involved in the inertia effects in stopping and starting the travel of the dough supply web and the associated conveyor and drive mechanism.

The present invention is concerned with this type of horizontal laying method and aims at providing improvements calculated to remove the disadvantage—inherent to the prior proposal above referred to and like proposals—which involves the starting and stopping or intermittent travel of the whole of the dough supply web, and providing an arrangement whereby a dough web or continuous sheet may be continuously fed to lamination laying means.

The invention consists in a method and means for the formation of laminated dough webs of the type indicated comprising continuously feeding a dough supply web towards a dough laying position in a substantially horizontal path of bight form adapted to provide a capacity or "pool" of dough web and adjusting the bight arrangement alternately to liberate or give up and accommodate or receive dough laying lengths as the dough is laid on a receiving conveyor in forward and rearward laps respectively.

The invention consists in means of the type indicated having an endless conveyor (for the dough supply web) continuously driven at a uniform speed and comprising:

(1) A substantially horizontal dough laying bight passing around a reciprocating terminal roller (referred to as the laying roller) the stroke of which accords with the length of dough lamination lap or fold to be laid on a receiving conveyor;

(2) A displaceable (i. e. extensible and retractable storage or "pool" bight disposed in a position preceding and in the opposite sense to, the laying bight and passing around a roller (called the "pool" roller) horizontally displaceable in the same sense or direction as the laying roller reciprocates; and including an auxiliary endless conveyor or device for causing the dough web to form a similar bight which follows the movements of the "pool" roller, the rate of displacement of the "pool" bight and associated conveyor being adapted:

(a) To liberate or give up a lap length of dough web on the forward stroke of the laying roll so that dough is fed forward in the laying bight at double the rate of the forward travel of the laying roller to enable a length of dough positively to be fed over said roller and laid upon the receiving conveyor (or upon a previously laid lap of dough) at the same rate as the continuous rate at which the dough conveyor is driven, and (b) To accommodate or absorb from the continuous feed, on the rearward stroke of the laying roller, a lap length of dough so that the dough on the laying bight (i. e. immediately behind the laying roller) is brought to rest and the laying roller, in receding, deposits the stationary lap length of dough upon the receiving conveyor or the previously laid lap of dough, and (3) A compensating bight disposed in a position below and in the opposite sense to the laying bight, and supported upon a roller arrangement displaceable to accord with the reciprocations of the laying roller and the displacements of the roller arrangement of the "pool" bight.

Further features of the invention will be described hereinafter.

In the accompanying drawings:

Figure 1 is a side view of a machine according to the invention with the parts in position at the commencement of a cycle, Figure 2 is a corresponding plan, Figure 3 is a sectional elevation on line 3—3 of Figure 1, Figure 4 is a diagram showing a complete cycle of operations, and Figure 5 is a side view of a modified arrangement of machine.

In carrying the invention into effect according to one mode as described by way of example as applied to the formation of a continuous laminated dough web upon a transverse receiving conveyor 10, an endless canvas or other conveyor 11 is provided for supporting and feeding a continuous dough web received from a dough sheeter or any other suitable source of supply operating continuously. This dough supply conveyor 11 is driven by a roller 12 which is rotated continuously at a uniform predetermined rate and which may be conveniently located to the rear of the dough laying end of the conveyor.

Describing the path of the conveyer 11: the web from the driving roller 12 passes around a tension roll 13 and a guide roll 14 to an upper horizontal run 11a where it is lapped around a roller 1 returning rearwardly parallel to itself to form a forward bight. The lower lap 11b of this bight terminates around another roller 2 and is redirected to form a horizontal forward run 11c which constitutes the dough supporting surface of a dough laying bight. This dough laying bight is supported upon a terminal roller 3 (referred to as the laying roller) and the under lap 11d of this bight (travelling rearwardly) is passed, on what may be termed the return lap of the conveyor, around a compensating roller 4 from whence the conveyor passes forwardly around a fixed turning point roll 5 and back to the driving roller 12.

According to the above arrangement a forwardly directed dough laying bight is formed by the roller 2, the laying roller 3 and the compensating roller 4 and a rearwardly directed bight is provided by the rollers 1, 2 and 3 to constitute the storage or "pool" referred to above. The dough web supporting surfaces of the conveyor 11 are provided by the upper run 11a to the roller 1 and the length 11c which extends from a position forward of the roller 2 to the roller 3. The dough web is caused to conform to the "pool" bight of the dough conveyor by the interposition in said bight of a horizontal short endless conveyor 15 running over idle (or driven) rollers 6 and 7, the roller 6 being located adjacent the roller 2 while the roller 7 is disposed towards the laying roller 3. The upper lap 15a of this short conveyor 15 constitutes an auxiliary dough supporting surface to function in association with those above indicated.

The "pool" supply is manipulated by rolls 1, 2, 3, aided by the short endless conveyor 15, 15a on rolls 6 and 7. When laying roll 3 moves toward the right the "pool supply" gives up dough and when 3 retracts to the left the "pool supply" takes up dough.

A continuous intake feed of dough web near drum 12 is converted into alternate right- and left-hand layers on conveyor 10, without affecting the uniform travel of conveyor 11 as a whole.

The rollers 2 and 3 and 6 and 7 are all mounted in bearings upon a reciprocating dough laying carriage A, the stroke of which accords with the length of the laps of dough to be laminated. In the case under consideration the stroke of the carriage A is only slightly less in length than the width of the transverse receiving conveyor 10.

The driving roller 12 of the dough conveyor 11 continuously drives the conveyor at a predetermined rate and the rate of travel of the dough conveyor and that of the transverse conveyor 10 are chosen and correlated with a view to providing the required overlap of the successive layers of the laminated dough web to be formed.

The laying carriage A is reciprocated at substantially the same linear velocity as the continuous rate of travel imparted to the dough conveyor 11 by the drive and consequently the laying roller 3 will travel back and forth over the receiving conveyor 10 at the same velocity as that at which the dough conveyor 11 (with the overlying dough web) leaves its driving roller.

The rollers 1 and 4 are mounted in bearings upon a compensating carriage B which is reciprocated at half the rate at which the carriage A is reciprocated and consequently has a stroke half the length of that carriage.

In the above described conveyor arrangement the dough web travels as follows:

Dough web from a sheeter or other source is delivered continuously, preferably as an uninterrupted ribbon or web, onto the upper run 11a of conveyor 11 and travels forward to roller 1. There the dough web inverts and transfers onto the run 15a of the short endless auxiliary conveyor 15 and is thereby carried rearwardly to the auxiliary roller 6. The dough web then passes over roller 6 and again inverts while re-transferring onto the top run 11c of the dough-laying bight near the roller 2. The dough is carried forward on 11c to roll 3 where it is dispensed onto the finished laminate conveyor 10.

The laying carriage A (Fig. 1) upon which the rollers 2, 3, 6 and 7 are mounted to rotate in suitable bearings comprises side plates 16 secured together by transverse channels 17. At its rear end the carriage A is provided with rack elements 18. The side plates 16 are located between pairs of grooved wheels 19 and 20 which are carried by the compensating carriage B.

The compensating carriage B is formed by upper and lower plates 21, 22 which are secured together by vertical side plates or frames 23, 24. In the side plates 23, 24 bearings are provided for transverse splindles or bars 25, 26, 27, 28 on which the grooved wheels 19 and 20 are mounted. The side plates 23, 24 are slotted at 29 (Figure 3) and the carriage B extends through these slots.

Pinions 30 are secured to the lower rear grooved wheels 19. These pinions mesh with the racks 18 on the laying carriage A and also with fixed racks 31 secured to the framing 32 of the machine. The grooved wheels 19 run between guide rails 33, 34 fixed to the framing.

The ends of the spindle 25 are connected by links 35 to oscillating levers 36 pivoted upon a rock shaft 37. The levers 36 are oscillated by a cam 38 secured to a shaft 39 and engaging rollers 40 on a link 41 pivoted to the levers. The shaft 39 is driven by any suitable means such as a belt pulley 42 and a drive to the conveyor roller 12 is taken from the shaft 39 by chain and sprockets 43, 44.

By the arrangement of the rack and pinion gear 31, 30 and 18, the movements of the compensating carriage B are at half the rate of those of the laying carriage A.

In operation, assuming that the laying carriage A is in the rearward position Fig. 1 and ready to make a forward stroke for the roller 3 to lay a lap length of dough sheet upon the receiving conveyor 10, during the forward displacements of the carriage A and roller 3, it will be appreciated that in order to cause the dough web to be positively fed over the roller 3, the conveyor length between the rollers 2 and 3 must be travelling temporarily at double the speed at which the roller 3 moves forward, otherwise the forward travel of this roller would simply cause the hold up of the dough web because the latter is only being fed forwardly by the travelling conveyor surface at the same rate at which the roller 3 is making its stroke. The increased speed of the dough web is added by the forward displacement of the rollers 2 and 6 and retraction in the "pool" bight length while the roller 1 moves forward with the compensating carriage B at half the rate of the laying carriage A as already indicated. This forward movement of the roller 3 lays a lap length of dough upon the receiving conveyor 10 and a lap length of dough lies in waiting immediately behind the roller 3 on the lap 11c of the conveyor lying between rollers 6 and 3. Meanwhile the roller 4 moving forwardly with the compensating carriage B accommodates the forward travel of the roller 3, bringing the lap 11d of the conveyor lying between the rollers 3 and 4 temporarily to rest and releasing the same length of conveyor for return to the driving roller 12.

After the roller 3 and laying carriage A have completed their forward stroke the direction of movement of the carriage is reversed and the roller 3 makes a retrograde stroke. During this movement the travel of the roller 6 (with the carriage A) follows the roller 2 and extends or increases the length of the "pool" bight rearwardly, a sufficient dough length being taken up or absorbed in the bight temporarily to bring the dough web behind roller 3 to rest. That is, the forward travel of the dough sheet on the portion of run 11c just rearward of laying roller 3 is cancelled by equal rearward travel of the conveyor 11 as a whole, so at that place the dough sheet is for the moment stationary with respect to 10. In this recession the roller 3 simply withdraws from under the dough lap length lying immediately behind it on the conveyor and deposits on the receiving conveyor 10 as a reverse lap to that previously laid.

While the roller 3 is moving rearwardly it will be appreciated that the roller 1 recedes at half rate to replenish the dough web length on the short conveyor 15 (rollers 6 and 7) and a corresponding length of conveyor is transferred to the return lap and this length is taken up by the rearward travel at half the rate of the roller 4 with the compensating carriage B.

It will be understood that during the forward and rearward strokes of the roller 3 the dough web leaves the guide roller 14 continuously at a constant rate and that only a portion of the length of dough web and the conveyor is brought temporarily to rest as described during a laying period, and this period of rest is followed by an acceleration at double the feed rate during an equivalent period in travelling from the roller 6 to the roller 3.

The above operations are alternately repeated so that the required succession of forward and rearward laps of dough are laid in superimposition on the receiving conveyor.

The path of dough web travel from intake drum 14 to roller 3 and deposit 10 is indicated in Fig. 4 by heavy black lines. The endless conveyor 11 and also the rollers that support and operate the conveyor are shown by lighter lines.

Successive relative positions of dough web, main auxiliary conveyor and rollers are shown in the first three views, where a, b, c are respectively the initial, middle, and final steps in the forward laminate laying movement of the roller 3. The positions d, e, are corresponding steps in the return or rearward laying movement.

In the diagram Figure 4: The parts at position a are shown when the roller 3 is about to move across the conveyor 10. At position b the roller 3 is still moving across the conveyor 10. At position c the roller 3 is at the end of its forward stroke and has completed the laying of the lamination of dough on the conveyor 10. At position d the roller is on its backward stroke and is laying the next lamination of dough.

The backward stroke is shown completed at position e and the parts are in position to repeat the cycle.

In carrying the invention into effect as described above according to a modification, see Figure 5, the roller 1a is fixed in position on the framing 32 and the rollers 2a, 6a and 7a are mounted upon one carriage C and the roller 3a is mounted upon another carriage D. The roller 4a or 5a may be mounted on the carriage C or upon an independent carriage having the same movements as the carriage C, or alternatively one or other of these rollers 4a and 5a may be fixed and the other may be controlled by a spring tensioning or gravity counterweight device.

According to this arrangement, Fig. 5, the carriage D and roller 3a move at the same rate as hereinbefore indicated while the carriage C with the rollers 2a, 6a and 7a, and in certain cases roller 4a or 5a, may be reciprocated, for example the roller 4a may be reciprocated in the same sense as the carriage D but at half the speed, and thus the feed of dough over the laying roller 3a is speeded up when the laying roller 3a moves forwardly, and on the reverse or rearward stroke of the roller 3a the dough web and conveyor length between the roller 6a and the roller 3a are brought temporarily to a standstill, with the result that as roller 3a recedes the support in this region is withdrawn from under the waiting lap length of dough. In this instance, the variation in the travel between the two carriages C and D is compensated for by the tensioning bight (or bights) in the return lap of the conveyor and the resilient displacements of associated rolls 4a or 5a or the displacement by means such as above referred to causing, for example, the roller 4a to move rearwardly, extending its bight or conveyor as the roller 3a recedes and vice versa.

The carriages C and D are mounted in the frame of the machine and are reciprocated in a similar manner to the carriages A and B of the first form of the invention.

The transverse conveyor 10 may deliver the laminated web directly to the break rolls of a cutting machine or the laminated web may be severed into batches and fed to several cutting machines or to dough break mechanism.

The dough supply conveyor driving roller may receive motion from any suitable source of power. Where a cutting machine is served, the driving roller of the dough supply conveyor may be driven from the cutting machine so that the supply thereto is controlled in accordance with the requirements of the cutting machine.

Reciprocation may be communicated to the reciprocating carriages A and B or C and D by any suitable known means, for example the means for causing reciprocation at the appropriate speeds may be of the same kind (or with appropriate adaptation) as the means usually employed for reciprocating the panner adapted to deliver cut dough shapes from a biscuit cutting machine.

In reference to either of the modes described above of carrying the invention into effect means may be provided with a view to facilitating the folding or lapping of the dough in zig-zag fashion upon the receiving conveyor 10. It will be appreciated that due to the relative movement of the receiving conveyor the edges of the laps or folds will not lie at right-angles to the edges of the receiving conveyor but will be slightly oblique in opposite sense in succeeding laps or folds. In order to ensure that the dough be folded by the laying roll evenly and in zig-zag fashion it may be desirable to employ a guiding roller mounted forwardly of the laying roller.

According to one form a guide roller 45 of small diameter and corresponding in length to the width of the dough web is supported in bearings in a light frame 46 which is mounted to pivot about a vertical axis 47 and preferably passes through the axis of the guide roller and lies on the centre line of the laying conveyor 11. The pivot 47 is carried by a frame 48 secured to the carriage A or C. Each time the laying carriage A or C reaches the forward or rearward end of its stroke the pivoted roller 45 makes an accommodating movement through a small angle about its supporting axis 47 so that it guides the tracking of the fold of the dough edges as it is being laid.

If desired, fat or flour or a mixture of fat and flour may be applied to the dough web in transit to the laying station and this can be conveniently effected by providing fat and/or flour applying means mounted above the auxiliary conveyor (which passes over the rollers 6 and 7) and above the dough supply conveyor at a point where it is free of dough, for example, in front of the roll 14 or between the rolls 2 and 6, so that the fat or flour deposited upon the conveyors is passed as the conveyor surfaces are moved into contact with the dough web and transferred thereto.

I claim:

1. Means for forming a laminated dough web having an endless conveyor continuously driven at a uniform speed and comprising a dough laying bight having endwise reciprocatory movement across a dough receiving conveyor; a storage or "pool" bight preceding and extending in the opposite direction to the laying bight; the "pool" bight having a reciprocatory movement in the same direction as the laying bight, an auxiliary endless conveyor located in the "pool" bight to cause the dough web to form a "pool," a feeding bight preceding the "pool" bight and extending in the opposite direction to the "pool" bight; and a bight adapted to compensate for the reciprocatory movements of the laying and "pool" bights, the arrangement being such that the "pool" bight alternately liberates or receives dough web as the dough is laid on the receiving conveyor by the forward and rearward reciprocations of the laying bight; all of said bights constituting integral parts of the said endless conveyor, and arranged one below the other in the following order and operating sequence, viz: the feeding in bight, the storage or pool bight with the auxiliary endless conveyor received therein, the dough-laying bight and the compensating bight.

2. Means for forming a laminated dough web as claimed in claim 1, wherein the laying bight and "pool" bight pass around rollers mounted upon a reciprocating laying carriage which also carries the said auxiliary conveyor, and the feeding bight and compensating bight pass around rollers mounted upon another reciprocating compensating carriage, the compensating carriage moving in the same direction and at half the speed of the laying carriage.

3. Means for forming a laminated dough web as claimed in claim 1, wherein the laying bight passes around a roller mounted on a reciprocating laying carriage, the pooling bight passes around a roller mounted on a compensating carriage which also carries the said auxiliary conveyor and a roller around which the compensating bight passes, the feeding bight passing around a roller on a fixed axis, the compensating carriage adapted to move in the same direction and at half the speed of the laying carriage.

4. Means for continuously converting an uninterrupted web of dough into laid up laminations, comprising an endless conveyor that is driven continuously in a course arranged to present an initial run for dough intake, a final return run and an intermediate series of bights each having a bent portion lapped around a roller and two substantially parallel run portions; said series comprising a feeding-in bight that projects forwardly and is situated at the top of the series, with its upper run extending forwardly, and its middle part lapped around a return roller and its lower run extending rearwardly; a storage or pool bight of variable length projecting rearwardly, whose upper run is the lower run of the said feeding-in bight, whose bent portion is lapped around a pool roller, and whose lower run extends forwardly to a laminate laying station; an auxiliary endless conveyor operating within the storage or pool bight and mounted on spaced apart end rollers, the upper run of the auxiliary conveyor arranged to travel rearwardly underneath the bottom run of the feeding-in bight in spaced relation thereto; a dough-laying bight projecting forwardly and having as its upper run the lower run of the above described storage or pool bight, the bent part of the dough-laying bight lapped around a reciprocating laminate-laying roll, and a compensating bight projecting rearwardly with its upper run extending from the said laying roll and lapped around a compensating roller and extending thence forwardly in and around a fixed turning point roll and finally in a rearward run to the said initial run.

GEORGE RALPH BAKER.

REFERENCES CITED

The following references are of record in the file of this patent:

UNITED STATES PATENTS

| Number | Name | Date |
|---|---|---|
| 1,975,326 | Loose et al. | Oct. 2, 1934 |
| 2,076,657 | Loose et al. | Apr. 13, 1937 |
| 2,130,097 | Loose et al. | Sept. 13, 1938 |
| 2,357,085 | Cohen et al. | Aug. 29, 1944 |

FOREIGN PATENTS

| Number | Country | Date |
|---|---|---|
| 322,490 | Great Britain | Dec. 5, 1929 |